United States Patent [19]

Podd et al.

[11] Patent Number: 5,706,964
[45] Date of Patent: Jan. 13, 1998

[54] REUSABLE CORNER AND BULKHEAD SYSTEM FOR BULK CARGO CONTAINER

[76] Inventors: Stephen D. Podd, 112 RR 1, North Hero, Vt. 05474; Victor I. Podd, 1678 SW. 20th Ave., Boca Raton, Fla. 33486

[21] Appl. No.: 296,745

[22] Filed: Aug. 26, 1994

[51] Int. Cl.⁶ ............................................. B65D 35/22
[52] U.S. Cl. ...................... 220/1.5; 222/94; 222/105; 422/40; 105/279
[58] Field of Search ...................... 220/1.5; 222/564, 222/514.05; 422/40; 105/279

[56] References Cited

U.S. PATENT DOCUMENTS

| | | | |
|---|---|---|---|
| 3,756,469 | 9/1973 | Clark et al. | 222/183 |
| 4,054,226 | 10/1977 | Bjelland et al. | 220/63 R |
| 4,124,136 | 11/1978 | Bjelland et al. | 220/68 |
| 4,232,803 | 11/1980 | Müller et al. | 222/105 |
| 4,557,400 | 12/1985 | Clarke | 222/105 |
| 4,799,607 | 1/1989 | Podd | 222/564 |
| 4,884,722 | 12/1989 | Podd | 222/535 |
| 5,040,693 | 8/1991 | Podd, Sr. et al. | 220/1.5 |
| 5,193,710 | 3/1993 | Podd, Sr. et al. | 220/403 |

FOREIGN PATENT DOCUMENTS 538586A 4/1993 European Pat. Off. ........ B65D 90/04

*Primary Examiner*—Joseph M. Moy
*Attorney, Agent, or Firm*—John C. Smith

[57] ABSTRACT

Reusable integrated bulkhead and corner units for cargo containers. The units open to form container bulkheads and or corner units as required by the nature of the cargo. For non-bulk cargo, the bulkhead folds against the container sidewall or ceiling. The bulkheads are moved by hinge mechanisms or track assemblies. The hinged corner units fold against the bulkhead or the container walls.

4 Claims, 13 Drawing Sheets

Prior Art

5,706,964

REUSABLE CORNER AND BULKHEAD SYSTEM FOR BULK CARGO CONTAINER

BACKGROUND OF THE INVENTION

1. Technical Field

The present invention relates to flowable cargo transported in lined or unlined bulk cargo containers. In particular, it relates to bulkheads and corner units used to control bulk cargo.

2. Background Art

Transportation of containers for bulk commodity products (grains, etc) have been implemented using a variety transport vehicles, such as trucks, railroads, and ships. Important economic factors in the transportation of bulk commodities are the speed and ease with which the commodities are unloaded from the container, and the cost related to equipment for restraining cargo during shipment, loading and unloading.

In both lined and linerless containers, bulkheads are typically used to create a temporary wall at the rear of the container. The bulkhead supports the weight of the cargo and provides a safety factor for workers during loading and unloading procedures. Typical prior art bulkheads are cardboard or plywood barriers which are installed with brace bars to guard against material failure. Installation of these devices adds to the labor cost due to the time required both for loading and unloading. In addition, since the bulkheads are made from material such as cardboard or plywood, they are usually not reusable which results in the additional expense of replacing the bulkhead for each new shipment of cargo.

Another prior art technique for handing bulk cargo is the use of corner units. Since many containers are unloaded via gravity through the use of tilting mechanisms, additional work is encountered during the unloading of containers due to the accumulation of cargo which fall into the corners of the containers. Corner units fit in the corner of the container near the discharge door and provide the function of directing commodity flow away from the corners of the container and towards the discharge door. By so doing, an additional labor step in the unloading process is eliminated or reduced since the corner units prevent cargo from being trapped in the corners during unloading. While corner units are useful in the unloading process, they have similar drawbacks to those typical of prior art bulkheads. Namely, they tend to be labor intensive to install, and are costly due to their non-reusable nature.

Prior art devices have incorporated corner units into bulkheads, including some with hinged attachments. However, these devices have the same drawbacks as other separate units including disadvantageous material and labor cost.

An important reason for constructing bulkheads and corner units as removable items is the important economic advantage of using the same container for both bulk cargo and for non-bulk cargo. In the case of non-bulk cargo, the bulkhead and the corner units are unnecessary. The corner units will cause valuable floor space to be wasted, and will also interfere with the loading and unloading of non-bulk commodities. For those reasons, bulkheads and corner units are typically removable, non-reusable items having the aforementioned drawbacks.

While solving various aspects of transporting and unloading bulk cargo in container systems, the prior art has chosen methods based on the use of non-reusable components which are costly and labor intensive. While such approaches have expanded the ability of a single container to haul many types of goods, they have inherent productivity drawbacks related to both labor and material expense. The prior art has not provided an reusable system of bulkheads and corner units which are reusable, can be rapidly installed, and can be efficiently stored during transportation of non-bulk cargo.

SUMMARY OF THE INVENTION

The present invention solves the foregoing problems by providing integrated bulkheads and corner units. The corner units are hinged to the container wall, and when not in use for bulk cargo, they are held by retainers which hold the corner unit flat against the container wall. An alternative embodiment attached the corner units to the bulkhead in the same manner. The bulkhead is also a reusable device which folds out of the way for transport of non-bulk cargo. In various embodiments, the bulkhead folds against the wall of the container or against the container ceiling when not required. The bulkhead attaches to the container via hinge assemblies or a track system. The corner units and bulkheads can be used in lined or unlined containers.

DESCRIPTION OF THE PREFERRED EMBODIMENT

Figure 1:
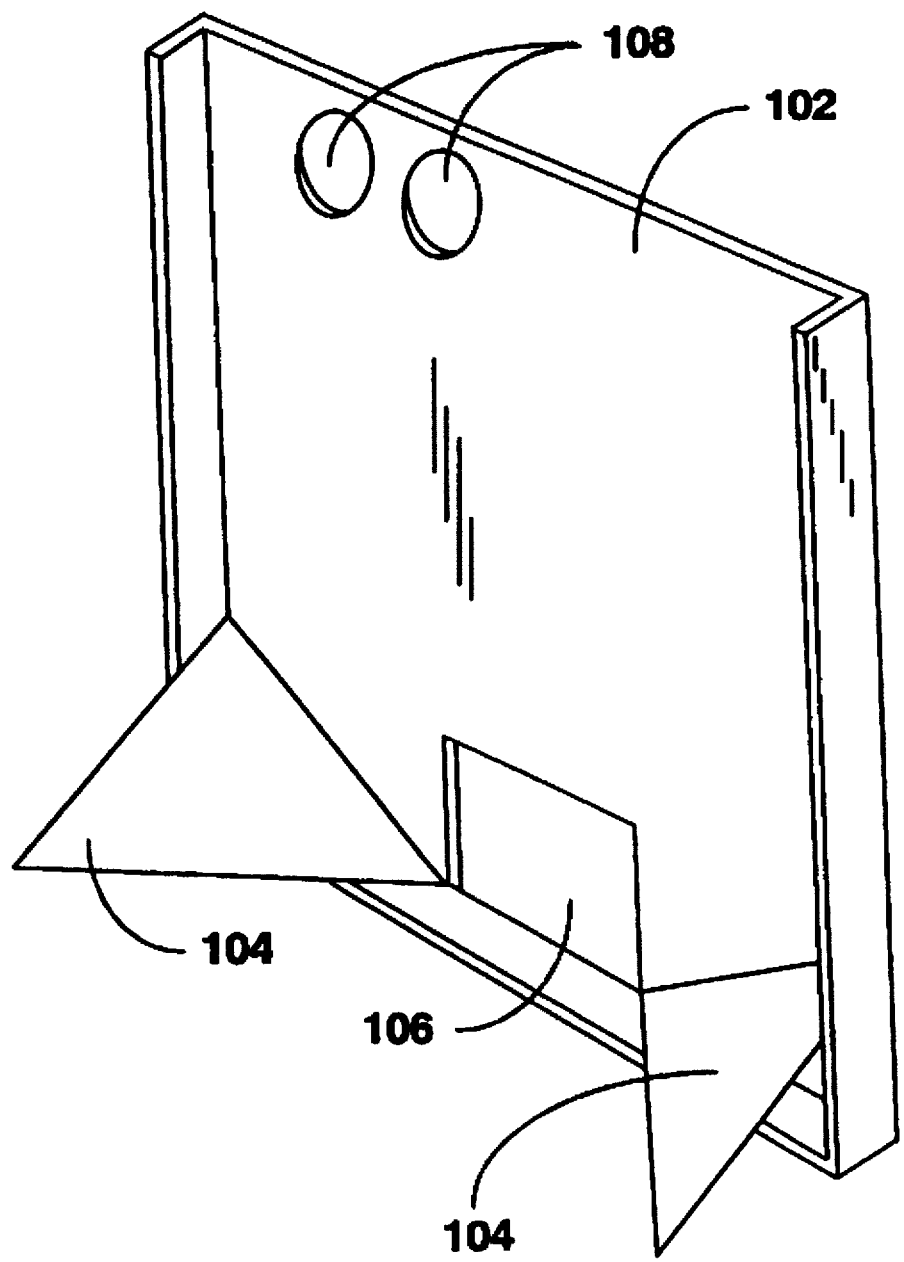
FIG. 1 is a diagram of a prior art corner unit and bulkhead.

Referring to FIG. 1, this figure shows a prior art bulkhead 102. Apertures 108 allow liner load/vent tubes 306 (shown in FIG. 3) to pass through the bulkhead. Discharge door 106 is located at the base of bulkhead 102. Corner units 104 are attached at lower opposing corners of bulkhead 102.

Figure 2:
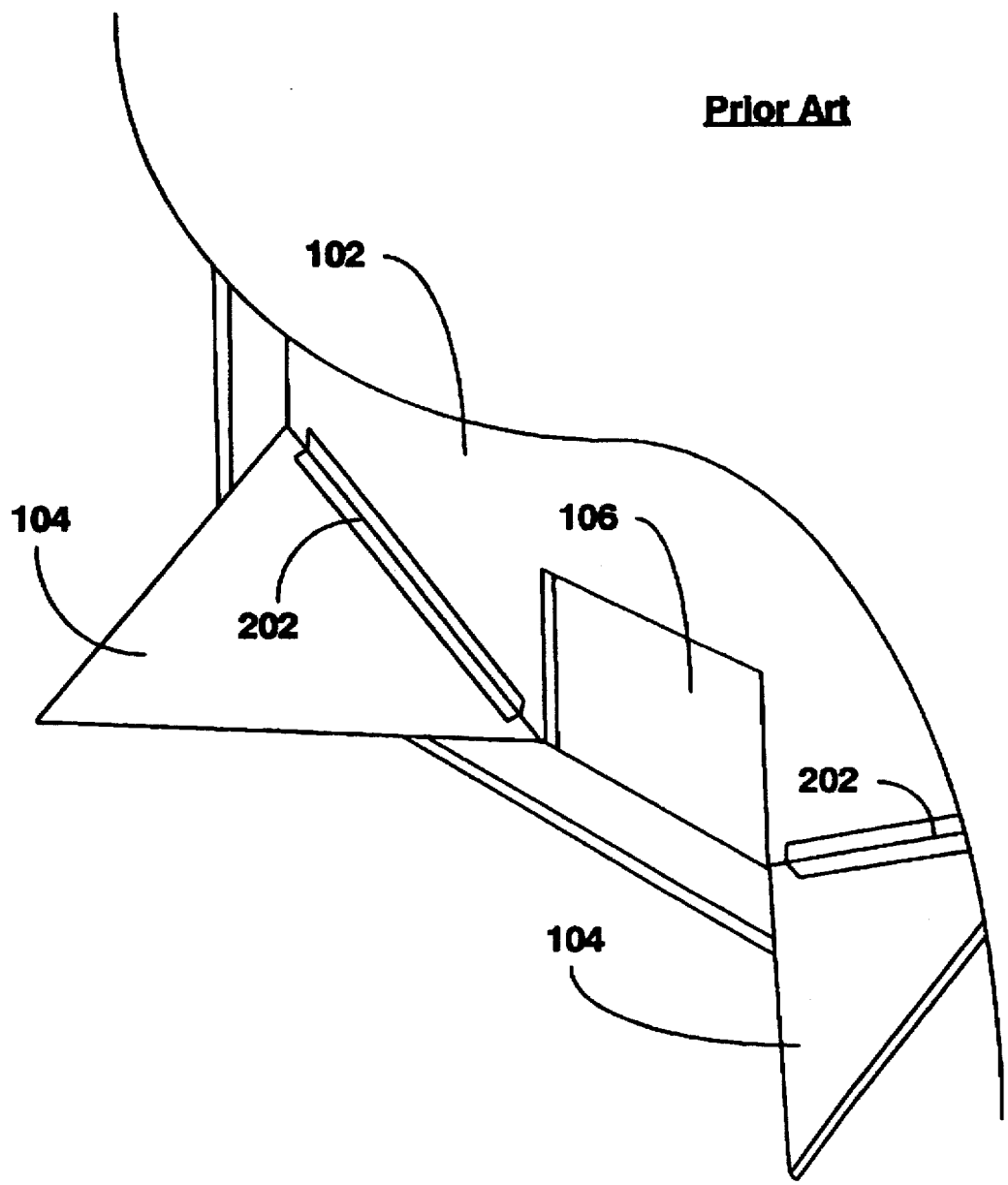
FIG. 2 is a more detailed view of the prior art corner unit in FIG. 1.

FIG. 2 is closeup view of an embodiment of the corner units of FIG. 1. In this embodiment, corners 104 are attached via hinges 202.

Figure 3:
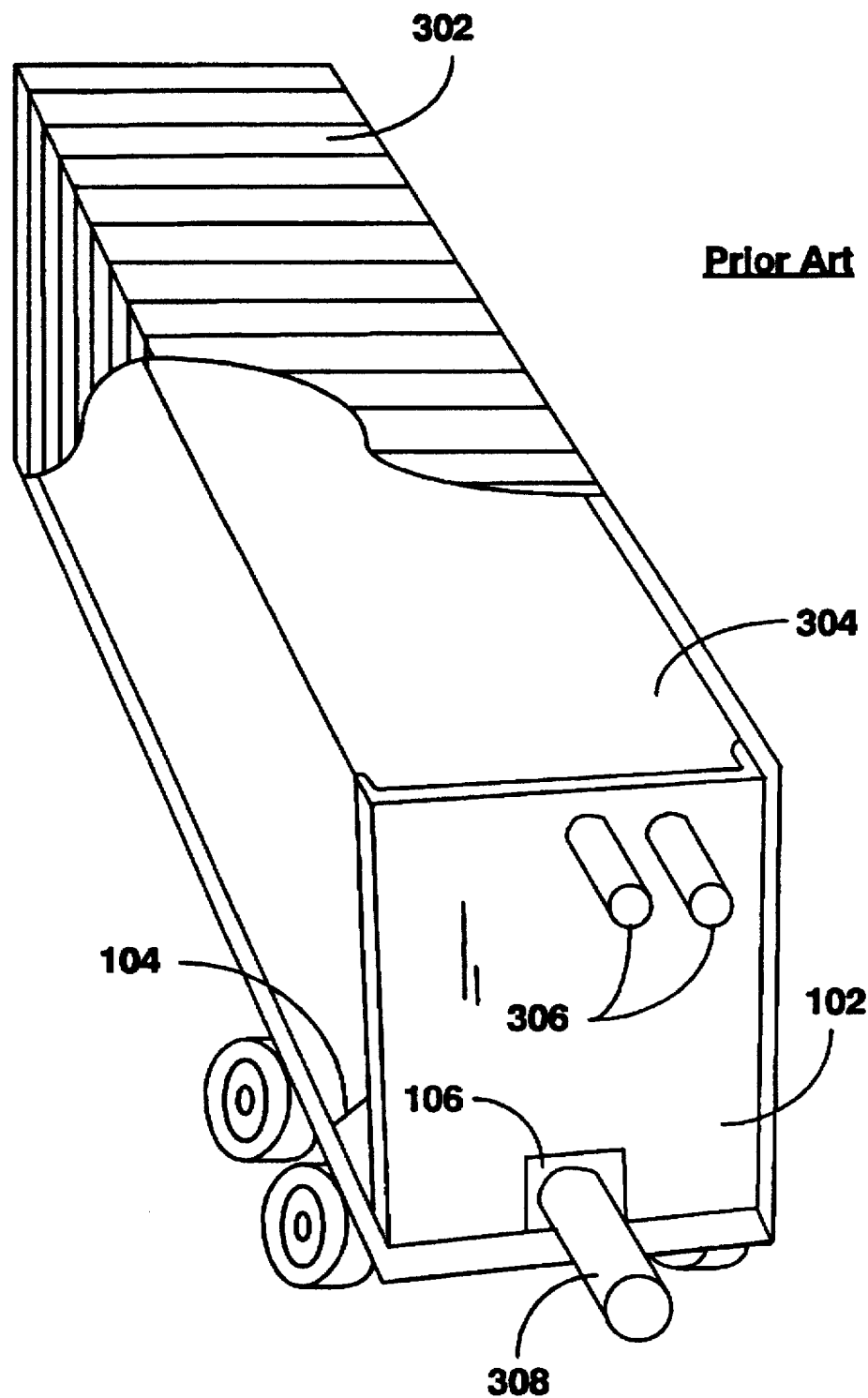
FIG. 3 is a diagram of a prior art container with an installed liner, bulkhead, and corner unit.

FIG. 3 shows a prior art container 302 which has liner 304 installed. Bulkhead 102 has discharge door 106 located at its base to allow discharge of cargo from container 302 as it is being tilted. During loading, discharge tube 308 is sealed and load/vent tubes 306 located near the top of the liner 304 are used to provide access for loading the cargo.

Figure 4:
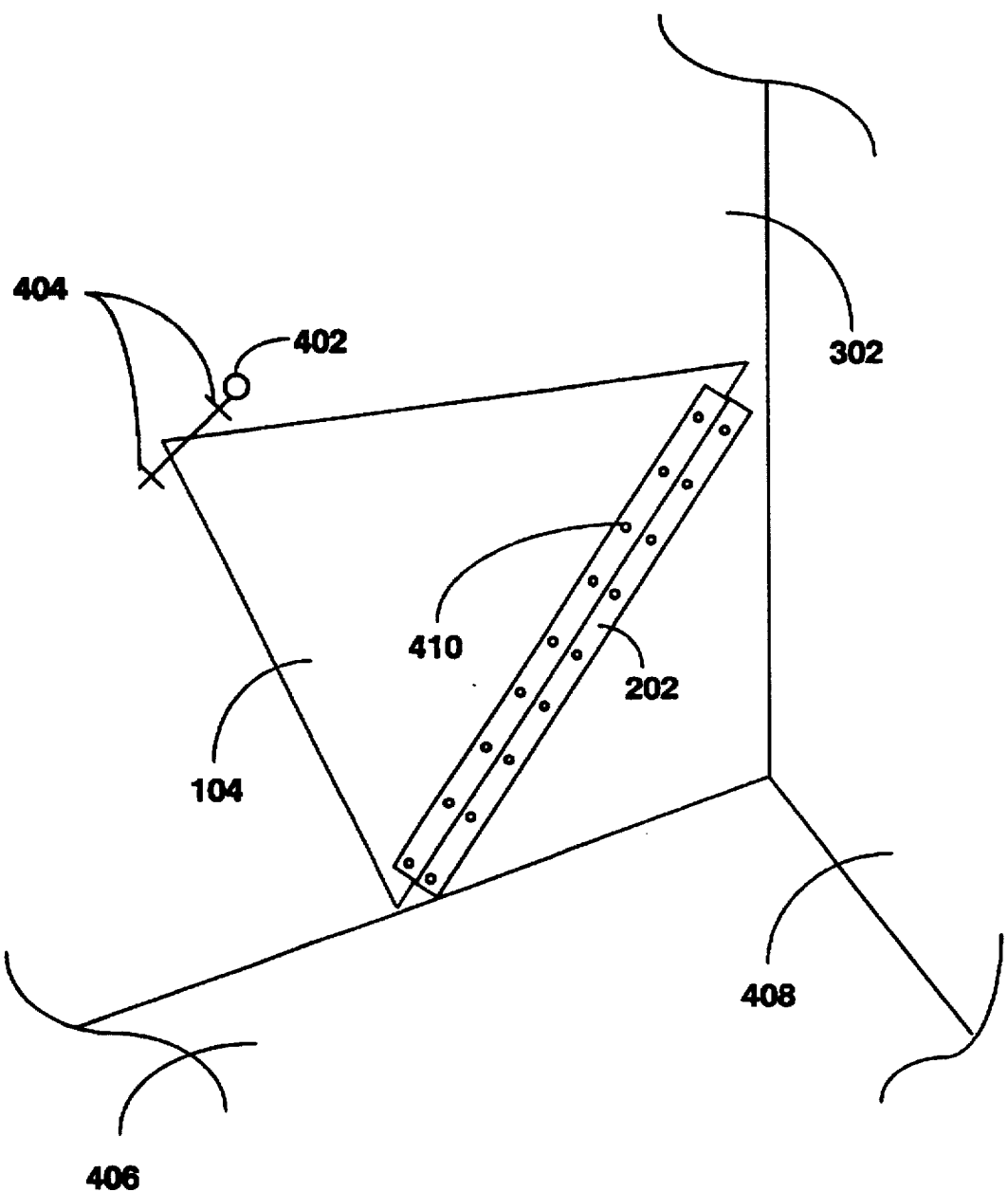
FIG. 4 is a diagram of a corner unit and retainer device attached to the side wall of a container in the closed.

FIG. 4 illustrates a corner unit 104 attached via hinge 202 to a side wall of container 302 near rear opening 408. Corner unit 104 is held flat against the wall of container 302 by retaining pin 402 which fits into pin holder 404. Those skilled in the art will recognize that any number variations may be used to secure corner unit 104 to the wall of container 302, including pins, latches, bolts, magnets, etc. The only requirement being that the hinge mechanism be sturdy enough to hold corner unit 104 to the wall of container 302 under load. Therefore, the attachment methods shown herein are intended for illustration only.

Corner unit 104 is shown in the closed position. In this position, corner unit 104 is held against the wall of container 302 and does not interfere with the loading or unloading of non-bulk cargo. Further, it allows non-bulk cargo to be transported by container 302 without loss of floor space. An advantage of reusable corner unit 104 is that its location need only be adjusted once during initial installation. Thereafter, corner unit 104 can be rapidly placed in the open position by merely removing retaining pin 402 and folding corner unit 104 down into the open position. In this position, the lower edge of corner unit 104 will rest on the floor 406 of container 302. The preferred embodiment envisions a corner unit 104 fabricated from a high strength durable material, such as steel. However, the invention can be implemented by other materials so long as they are sufficiently sturdy to be allow repeated reuse. By installing corner unit 104 on the wall of container 302, labor cost is reduced due to the speed an ease with which corner unit 104 is actuated. By manufacturing corner unit 104 from reusable material, shipping cost is reduced due to the elimination of expense heretofore caused by disposable corner units.

An additional advantage of corner unit 104 is that it is independent of bulkhead 102 due to the greater strength of corner unit 104 and due to the secured attachment provided by the wall of container 302 and the support provided by container floor 406. By eliminating the need for support from bulkhead 102, corner unit 104 can be used in conjunction with bulkheadless liners, thereby increasing the efficiency of these devices without incurring the unnecessary expense of a bulkhead 102.

Those skilled in the art will recognize that corner unit 104 can alternatively be located flat against the floor of the container and hinge upward from a floor mounted hinge to rest against a side wall and the bulkhead. In this configuration, when corner unit 104 is closed it can rest flat against the floor or or be located in a recessed opening in the floor.

Figure 5:
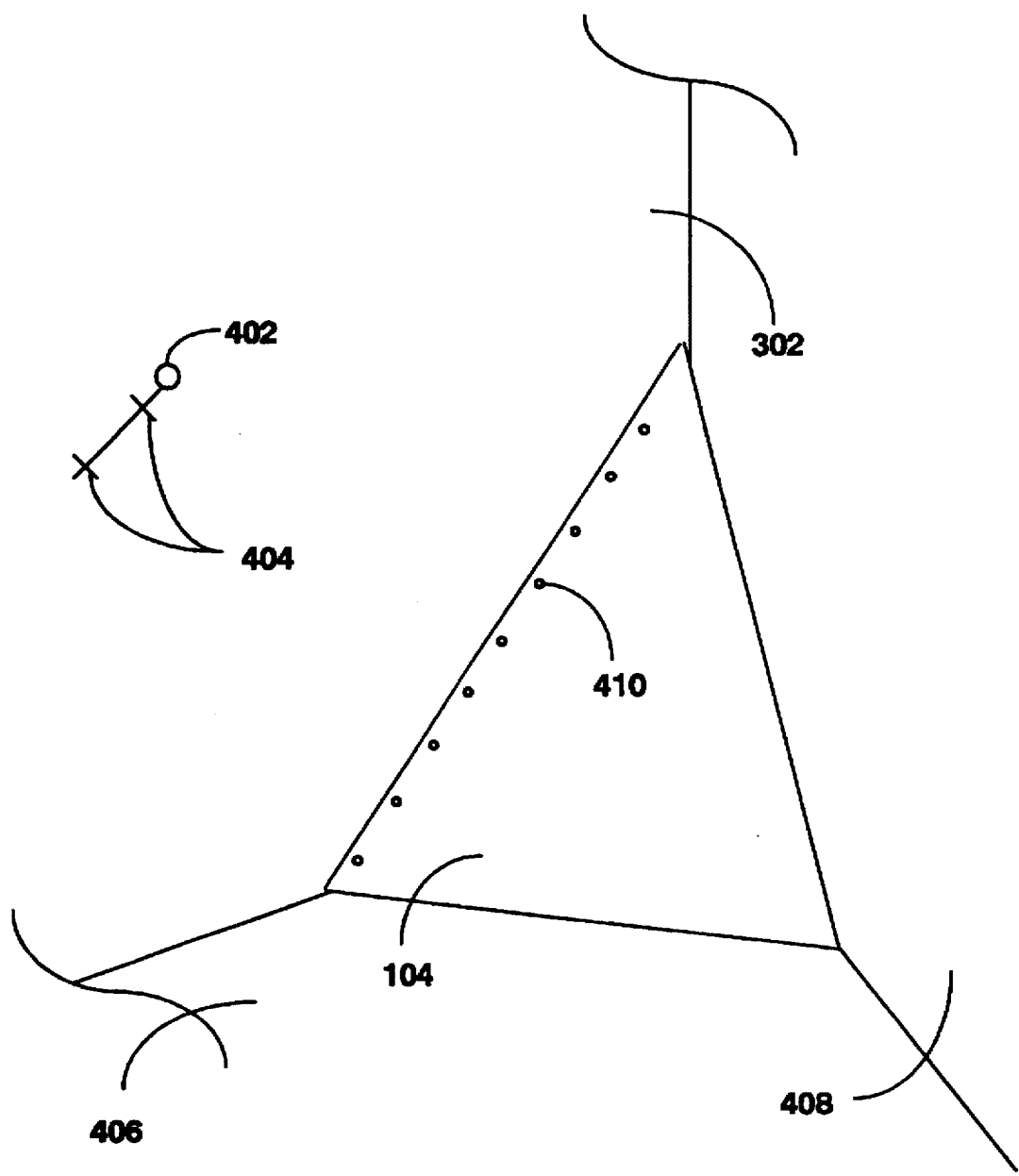
FIG. 5 is a diagram of the corner unit of FIG. 4 in the open position.

FIG. 5 shows corner unit 104 of FIG. 4 in the open position. Retaining pin 402 can be stored in pin holders 404 when not used to hold corner unit 104. As can be seen, corner unit 104 is supported by container floor 406 and the wall of container 302 via hinge 202. The third edge of corner unit 104 faces the open end 408 of container 302. While bulkhead 102 can provide additional support, it is not required.

Figure 6:
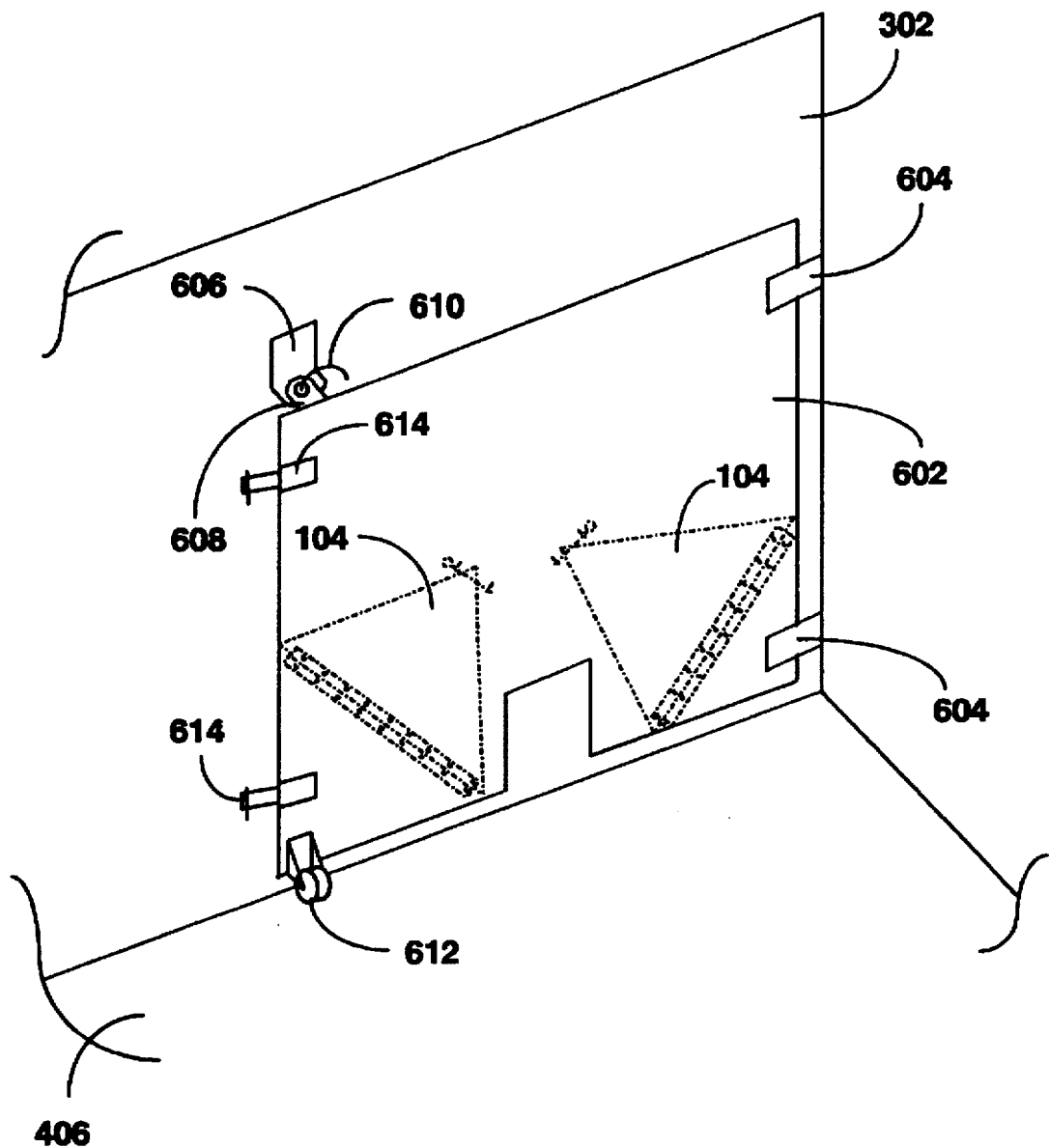
FIG. 6 is a single gate embodiment of the bulkhead with integral corner units, shown in the closed position.

FIG. 6 is an alternative embodiment showing the reusable corner units 104 integrated with a reusable bulkhead 602. The reusable bulkhead employs the same labor saving technique used by previously discussed corner units 104 in that when not needed, it conveniently folds flat against the side of container 302. This eliminates interference with non-bulk cargo while at the same time allowing rapid opening for use with bulk cargo. Bulkhead 602 is shown with hinges 604 attaching bulkhead 602 to container 302. Those skilled in the art will recognize that any number of variations in the hinge mechanism can be made without departing from the spirit of the invention. Optional wheel 612 is shown attached to the base of bulkhead 602. Depending on the weight and the width of bulkhead 602, wheel 612 may be employed to facilitate control and movement of bulkhead 602.

Bulkhead 602 is shown in this figure in the closed position. In this position, it is secured to the wall of container 302 by latch and pin assembly 606, 608, 610. Of course, any number of known securing means can be used to retain bulkhead 602 in the closed position.

An alternative method of securing bulkhead 602 is to use hinged locking devices 614 which can be inserted into lash pins in the grove of container 302 normally found behind the doors of most intermodal containers.

Another feature of this embodiment is the placement of reusable corner units 104 on the bulkhead 602 surface. In this embodiment, corner units retain the previously discussed advantage of folding for easy storage and non-interference with non-bulk cargo. Those skilled in the art will recognize that while corner units 104 are shown attached to bulkhead 602, the invention could easily be implemented by attaching corner units 104 to opposite walls of container 302 rather than to bulkhead 602.

Figure 7:
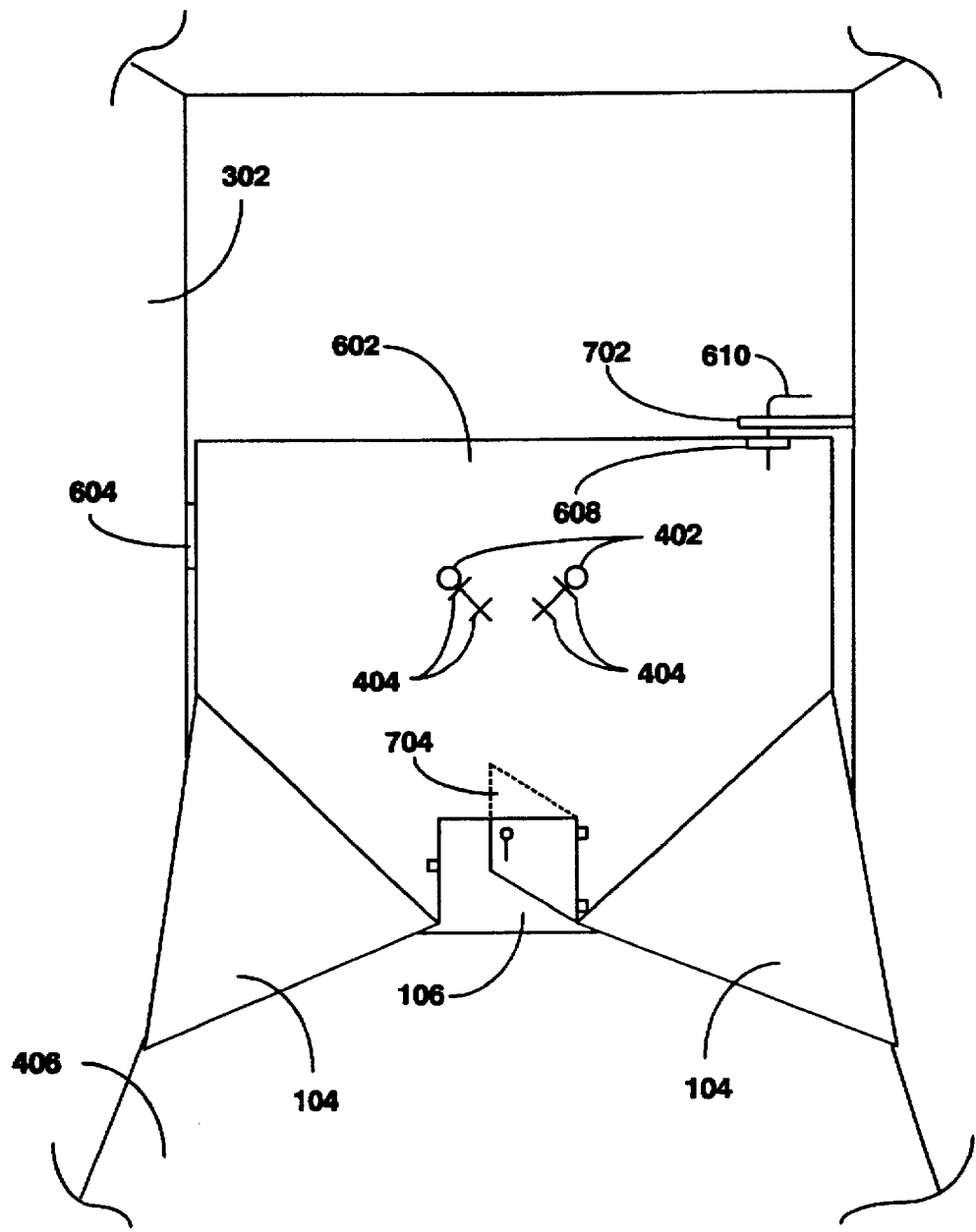
FIG. 7 shows the embodiment of FIG. 6 in the open position.

FIG. 7 shows the embodiment of FIG. 6 in the open position. This single gate embodiment allows a worker to release bulkhead 602 from its secured position against the wall of container 302, swing the bulkhead in gate-like fashion to the open position and secure bulkhead 602 to the opposite wall of container 302 via latch means 608, 610, 702. After bulkhead 602 is secured in the open position, corner units 104 are released from retention and moved to the open position (as shown). This procedure allows a single worker to rapidly install the reusable bulkhead 602 and corner units 104 without any delay caused by prior art installation methods, or any expense caused by disposable materials. If corner units 104 are attached to the wall of container 302, then bulkhead 602 would typically be secured first and then corner units 104 would be opened and placed into position against bulkhead 602. An optional hinged and latched door 704 is shown which can be used to securely hold the product and liner in place until discharge.

Figure 8A:
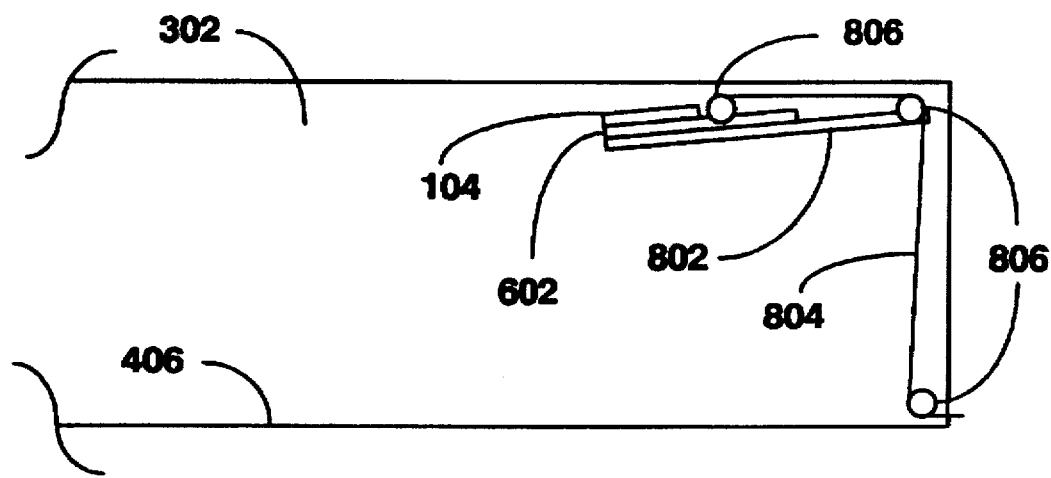
FIG. 8A–C is a side view of an alternative embodiment showing a hinged overhead bulkhead moving from the closed position (FIG. 8A) to the open position (FIG. 8C).
Figure 8B:
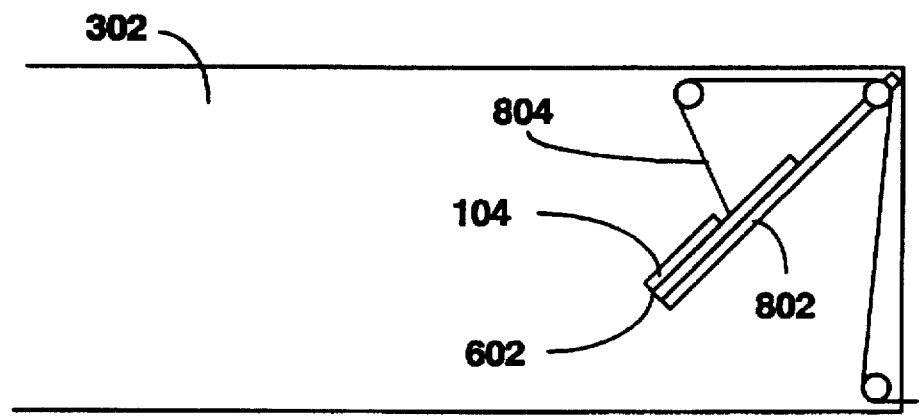
Figure 8C:
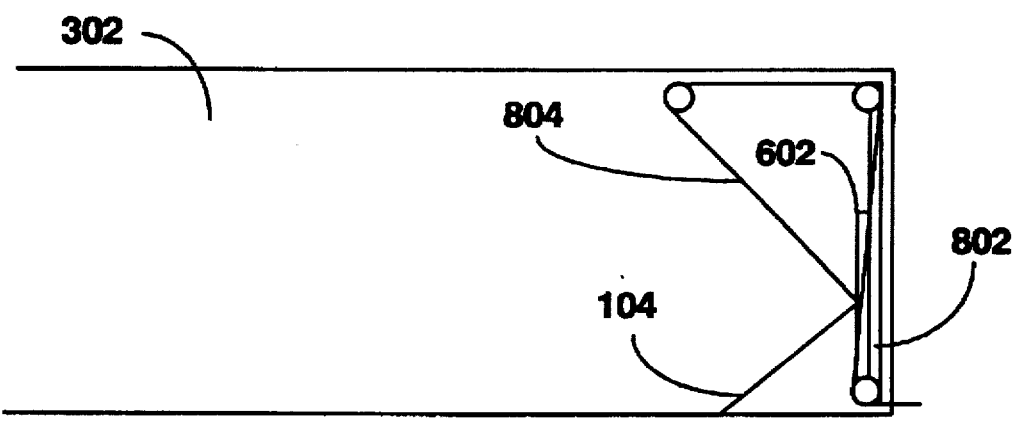

FIG. 8 illustrates an alternative embodiment in which bulkhead 602 and corner units 104 are stored near the ceiling of container 302. In this side view, FIGS. 8A through 8C illustrate the bulkhead 602 and corner units 104 moving from the closed to the open position. In FIG. 8A, support posts 802 are attached at one end to hinges 902 (shown in FIG. 9). Bulkhead 602 which is attached to the other end of support posts 802. In turn, corner units 104 are attached to bulkhead 602. Bulkhead 602, corner units 104 and support posts 802 are held up in the closed position by cables 804 through pulleys 806. For ease of illustration, a simple cable/pulley system is shown as the means to raise and lower bulkhead 602. However, any suitable lifting device can be used to control bulkhead position. In addition, the lifting means can be powered with a motor (not shown) or manually.

In the closed position of FIG. 8A, bulkhead 602 and corner units 104 are held above the cargo. This completely eliminates any interference with non-bulk cargo by moving bulkhead 602 out of cargo storage area.

FIG. 8B shows bulkhead 602 at midpoint in change of position. In FIG. 8C, bulkhead 602 is shown in the open position. In addition, corner units 104 are also shown in the open position. As was the case with the embodiment discussed in FIGS. 6 and 7, corner units 104 can be independently mounted on the wall of container 302 rather than on the bulkhead 602.

Figure 9:
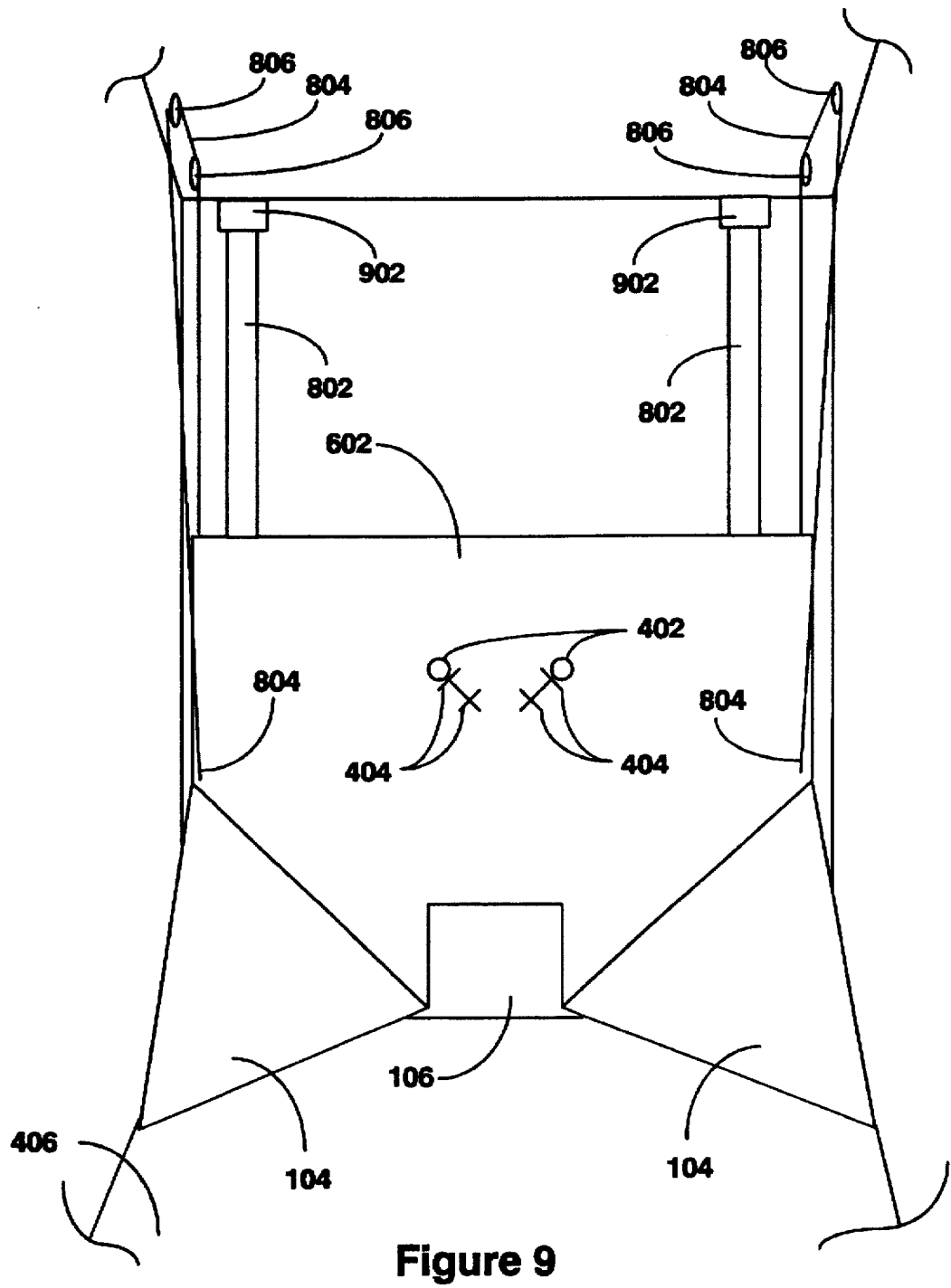
FIG. 9 is a front view of the embodiment of FIG. 8C in the open position.

FIG. 9 shows the embodiment of FIG. 8 in the open position. While the preferred embodiment envisions support posts 802 attached to hinges 902 at the ceiling of container 302, any number suitable attachment schemes may be implemented at the ceiling or to the side walls of container 302. In the open position, bulkhead 602 is secured to the sides of container 302 in the same manner as the embodiment discussed in FIGS. 6 and 7.

Figure 10A:
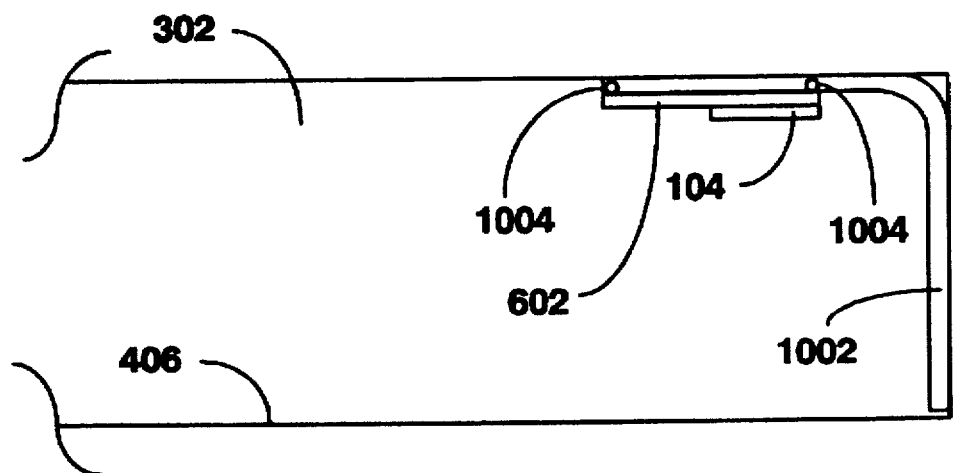
FIG. 10A–C is a side view of another alternative embodiment showing a track overhead bulkhead moving from the closed position (FIG. 10A) to the open position (FIG. 10C).
Figure 10B:
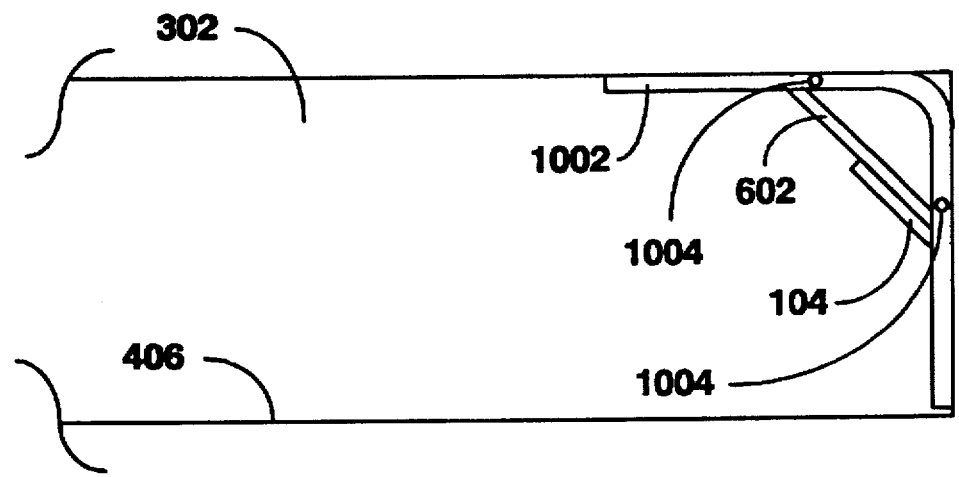
Figure 10C:
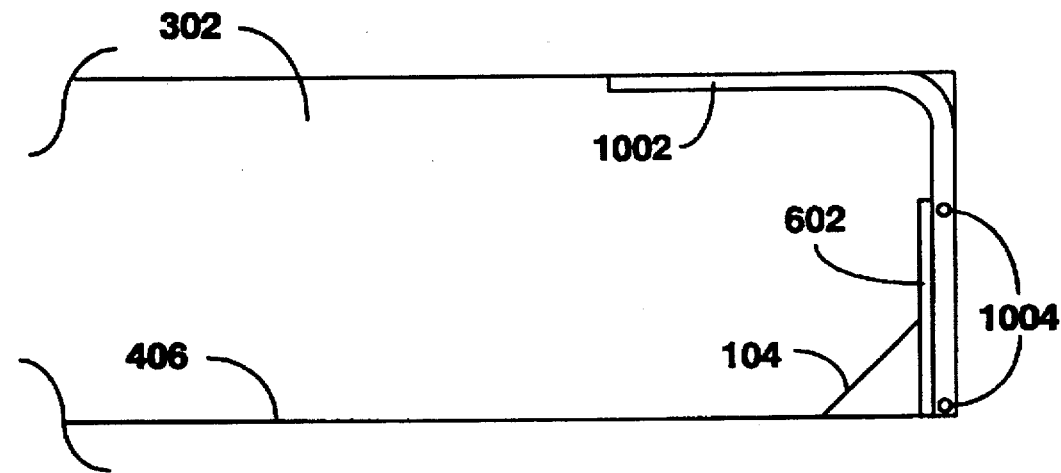

FIG. 10 illustrates another alternative embodiment in which bulkhead 602 and corner units 104 are stored near the ceiling of container 302. In this side view, FIGS. 10A through 10C illustrate the bulkhead 602 and corner units 104 moving from the closed to the open position. In FIG. 10A, track rails 1002 are attached to the ceiling and side walls of container 302. Bulkhead 602 which is slidably mounted on track rails 1002 by wheels 1102 (shown in FIG. 11). Bulkhead 602 and corner units 104 are held up in the closed position by a spring mechanism (not shown) similar to those commonly used for garage door openers. A strap (not shown) is attached to the base of bulkhead 602 to allow a worker to pull bulkhead 602 from the closed to the open position much like a garage door is closed.

In the closed position of FIG. 10A, bulkhead 602 and corner units 104 are held above the cargo. As was the case in the embodiment discussed in regard to FIG. 8 and 9, this completely eliminates any interference with non-bulk cargo by moving bulkhead 602 out of cargo storage area.

FIG. 10B shows bulkhead 602 at midpoint in change of position. In FIG. 10C, bulkhead 602 is shown in the open position. In addition, corner units 104 are also shown in the open position. As was the case with the embodiments discussed in FIGS. 6–9, corner units 104 can be independently mounted on the wall of container 302 rather than on the bulkhead 602.

Figure 11A:
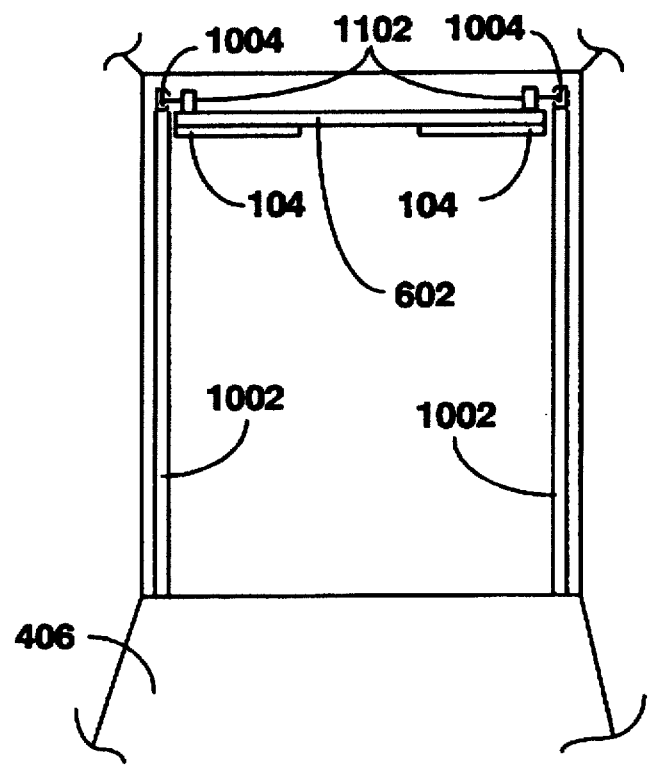
FIG. 11A–B are front view of the embodiment of FIG. 10A and 10C in the closed and open positions, respectively.
Figure 11B:
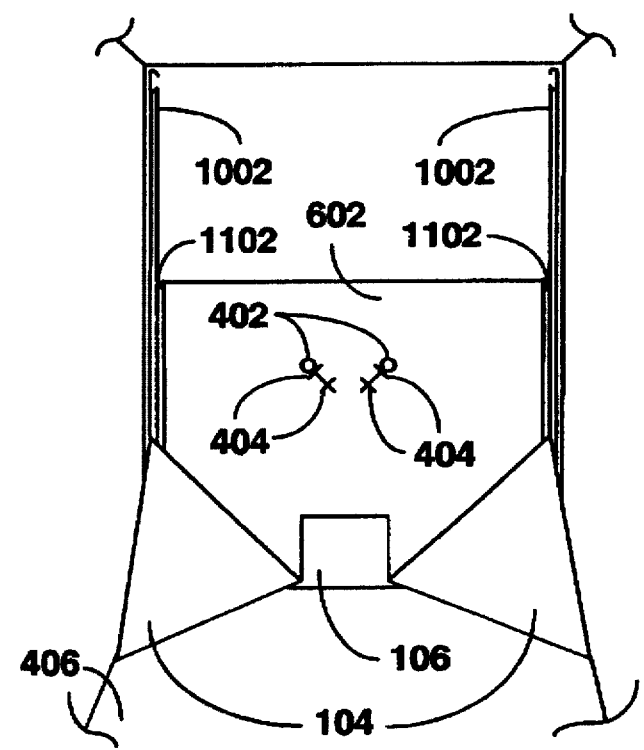

FIG. 11 shows the embodiment of FIG. 10 in the open position. In the open position, bulkhead 602 is secured to the sides of container 302 by track rails 1002 and to the floor 406 of the container 302 by latch means (not shown).

Figure 12:
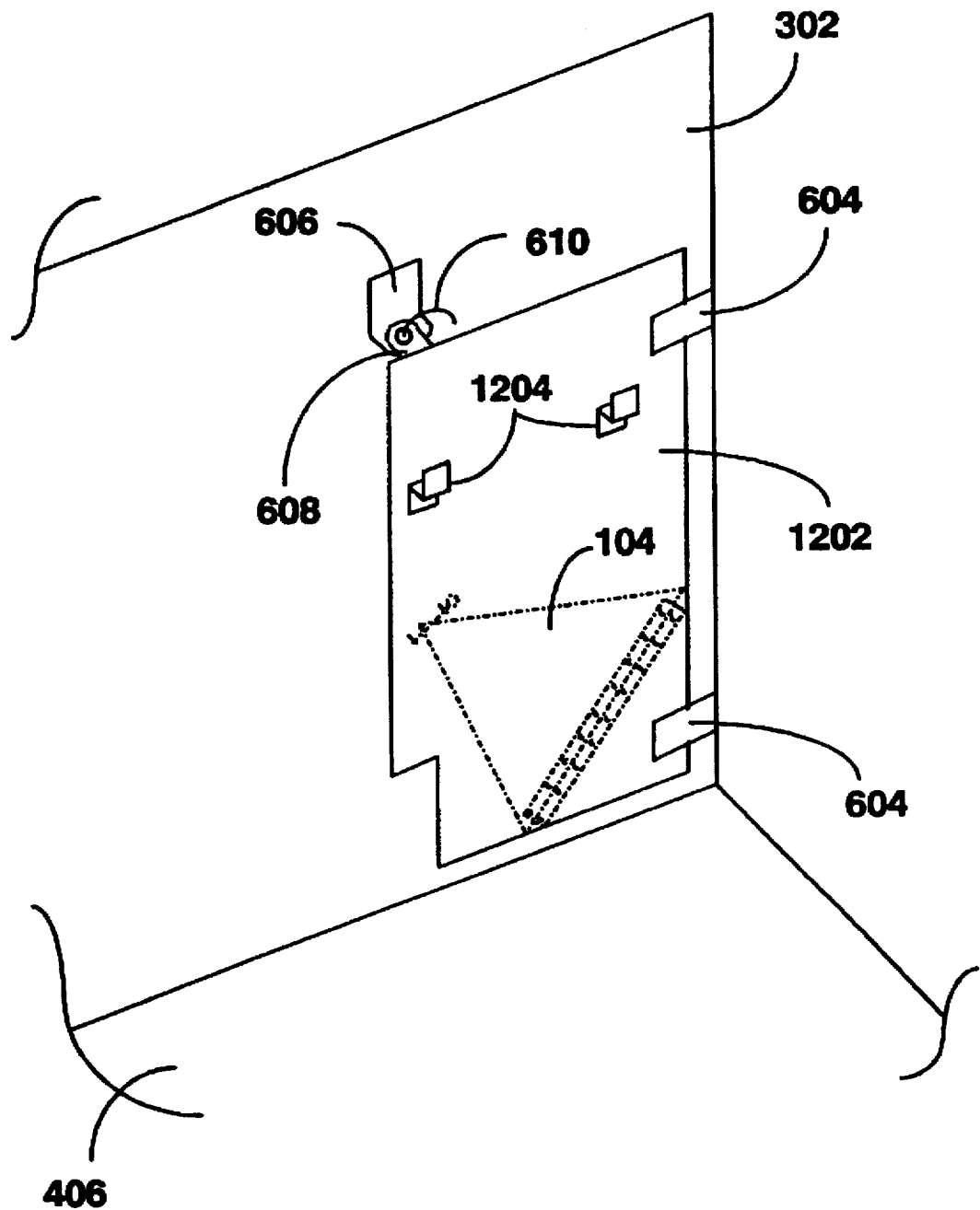
FIG. 12 is a double gate embodiment of the bulkhead with an integral corner unit, shown in the closed position.

FIG. 12 illustrates another alternative embodiment. This dual gate embodiment is similar to the single gate embodiment shown in FIGS. 6 and 7. The difference between this embodiment and the embodiment discussed in FIGS. 6 and 7 is as follows. In this embodiment, the bulkhead is split into two gates 1202 and 1302 (shown in FIG. 13), each attached to an opposite wall of container 302. Separate hinges 604 are required for each gate 1202, 1302, as well as latch and pin assemblies 606, 608, 610. Further, gates 1202, 1302 must be held together by a brace bar (not shown) when in the open position. The brace bar is held by brace bar retainers 1204. While a brace bar is used in the preferred embodiment, any suitable means of holding the gates 1202, 1302 in the open position may be used.

Figure 13:
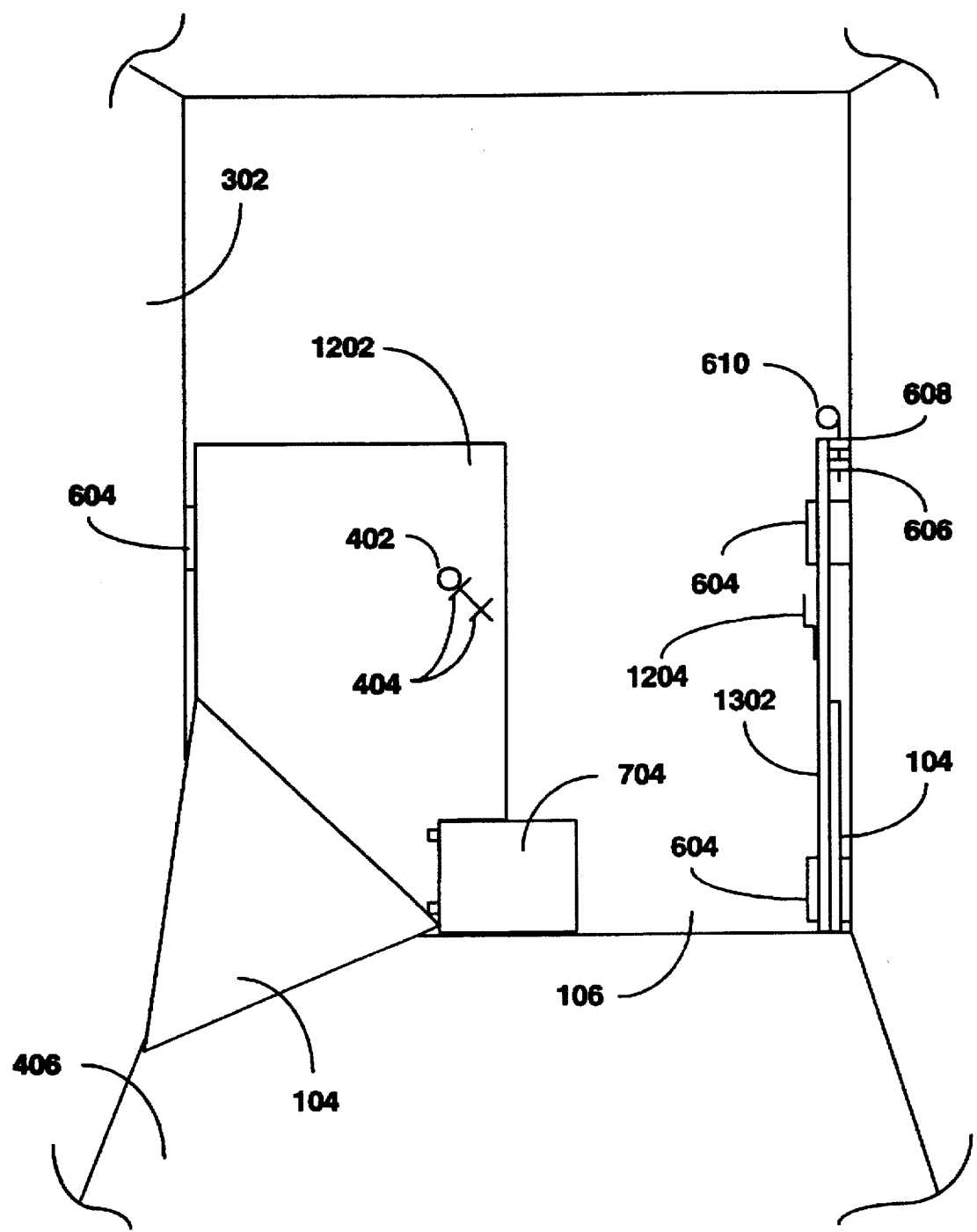
FIG. 13 shows a front view of the embodiment of FIG. 12 with one gate in the open position and the other gate in the closed position.

FIG. 13 shows the embodiment of FIG. 12 with one gate 102 in the open position and the other gate 1302 in the closed position. In all of the embodiments discussed above, corner units 104 can be implemented as attached to the wall of container 302 or to bulkhead 602. An ease of use advantage is achieved by attaching corner units 104 to bulkhead 602 because retaining pin 402 can be more easily reached from outside of container 302. The advantage of attaching corner units 104 to container 302 is the reduction of weight which must be supported or moved at any one time.

In each of the embodiments discussed above, installation of the intended components are more rapidly installed than heretofore possible, worker safety is improved by using sturdier parts which are less likely to fail, and cost savings are achieved due to the elimination of disposable parts.

While the invention has been described with respect to a preferred embodiment thereof, it will be understood by those skilled in the art that various changes in detail may be made therein without departing from the spirit, scope, and teaching of the invention. For example, the materials used may vary, corner unit attachment may vary, methods of attaching and moving the bulkhead may vary, etc. Accordingly, the invention herein disclosed is to be limited only as specified in the following

We claim:

1. A reusable cargo control device for a bulk cargo container, comprising:

hinge means for attachment to a side wall of a container;

retainer means attached to the side wall of a container; and a rigid corner panel having means to attach to the hinge means, the rigid corner panel when attached to the hinge means having a closed position in which the rigid corner panel is retained by the retainer means in a plane substantially parallel to the wall of the container, and an open position in which the rigid corner panel is hinged outwardly from the side wall of the container such that one edge of the rigid corner panel is attached to the side wall of the container and at least a portion of a second edge of the rigid corner panel rests on the floor of the container, when in the closed position, the rigid corner panel is held substantially flat against the sidewall of the container such that it does not interfere with the loading, unloading, or positioning of cargo in the container, when in the open position, the surface of the rigid corner panel further having an angle such that cargo resting on the surface of the rigid corner panel is guided towards the discharge port of the container during unloading of the cargo from the container.

2. A device, as in claim 1, further comprising:

a bulkhead;

a hinge to movably attach the bulkhead to the container such that the bulkhead can be placed in an open position or a closed position, in the closed position the bulkhead further being securably attached to and substantially adjacent to an inner surface of the container such that access to non-bulk cargo is substantially unobstructed, and in the open position the bulkhead further being securably attached to two opposing walls of the bulkhead such that the bulkhead forms a temporary wall to enclose bulk cargo; and the rigid corner panels further positioned such that when the rigid corner panel is in the open position, at least a portion of a third edge of the rigid corner panel rests against the bulkhead.

3. A device, as in claim 2, wherein the the hinge is attached to the bulkhead and to a side of the container such that the bulkhead swings between the closed position and the open position in gatelike fashion.

4. A device, as in claim 3, wherein the bulkhead further comprises wheels attached to the lower portion of the bulkhead substantially near the edge of the bulkhead opposite the hinge, the wheels supporting the weight of the bulkhead as it is moved between the open and the closed positions.

* * * * *